(12) United States Patent
Qi et al.

(10) Patent No.: US 11,101,640 B1
(45) Date of Patent: Aug. 24, 2021

(54) SOLID-STATE PROTECTION FOR DIRECT CURRENT NETWORKS

(71) Applicant: ABB Schweiz AG, Baden (CH)

(72) Inventors: Li Qi, Cary, NC (US); Peter Steimer, Ehrendinqen (CH); Liming Liu, Cary, NC (US); Jiuping Pan, Raleigh, NC (US)

(73) Assignee: ABB Schweiz, Baden (CH)

( * ) Notice: Subject to any disclaimer, the term of this patent is extended or adjusted under 35 U.S.C. 154(b) by 0 days.

(21) Appl. No.: 16/942,039

(22) Filed: Jul. 29, 2020

(51) Int. Cl.
*H02H 7/12* (2006.01)

(52) U.S. Cl.
CPC .................................... *H02H 7/12* (2013.01)

(58) Field of Classification Search
CPC ....................................................... H02H 7/12
See application file for complete search history.

(56) References Cited

U.S. PATENT DOCUMENTS

| | | | |
|---|---|---|---|
| 6,040,988 | A | 3/2000 | Rees et al. |
| 7,042,182 | B2 | 5/2006 | Hahn et al. |
| 7,218,014 | B2 | 5/2007 | Steinke |
| 7,327,053 | B2 | 2/2008 | Eckardt et al. |
| 7,723,869 | B2 | 5/2010 | Arpilliere et al. |
| 7,924,538 | B2 | 4/2011 | Weinert |
| 7,969,046 | B2 | 6/2011 | Nakayama et al. |
| 8,278,892 | B2 | 10/2012 | Friebe et al. |
| 9,065,299 | B2 | 6/2015 | Trainer et al. |
| 10,411,694 | B2 | 9/2019 | Cairoli et al. |
| 10,819,112 | B1 * | 10/2020 | Pan ............................ H02J 3/06 |
| 2018/0054084 | A1 * | 2/2018 | Paatero ....................... H02J 9/06 |
| 2019/0319530 | A1 * | 10/2019 | Giuntini ..................... H02J 9/06 |

OTHER PUBLICATIONS

C. Peng et al., "A Protection Scheme against DC Faults VSC based DC Systems with Bus Capacitors," 2014 IEEE Applied Power Electronics Conference and Exposition—APEC 2014, dated Apr. 24, 2014, pp. 3423-3428, Piscataway, US.
L. Tang et al., "Locating and Isolating DC Faults in Multi-Terminal DC Systems," IEEE Transactions on Power Delivery, dated Jul. 2, 2007, pp. 1877-1884, vol. 22, No. 3, IEEE, Piscataway. US.

* cited by examiner

*Primary Examiner* — Jue Zhang
(74) *Attorney, Agent, or Firm* — Taft Stettinius & Hollister LLP

(57) ABSTRACT

Systems, methods, techniques and apparatuses of fault protection. One exemplary embodiment is a protection system including a solid-state switching device, a galvanic isolation switching device, and a controller. The solid-state switching device is coupled between a switch arrangement of a power converter and a direct current (DC) link capacitor of the power converter. The galvanic isolation switching device is coupled between the DC link capacitor and a DC network. The controller is structured to determine a fault is occurring within the DC network, open the solid-state switching device in response to determining the fault is occurring, receive a measurement corresponding to an electrical characteristic of a fault current flowing through the galvanic isolation switching device while the solid-state switching device is open, and determine a location of the fault based on the received measurement.

20 Claims, 5 Drawing Sheets

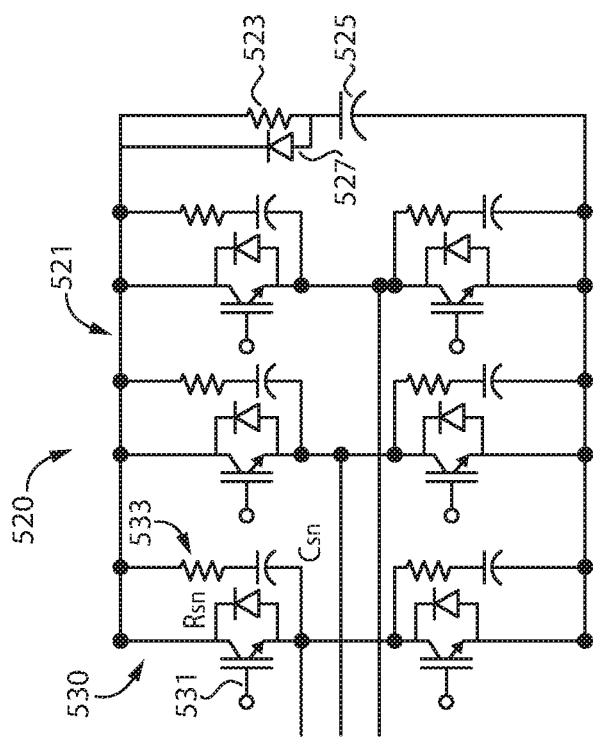
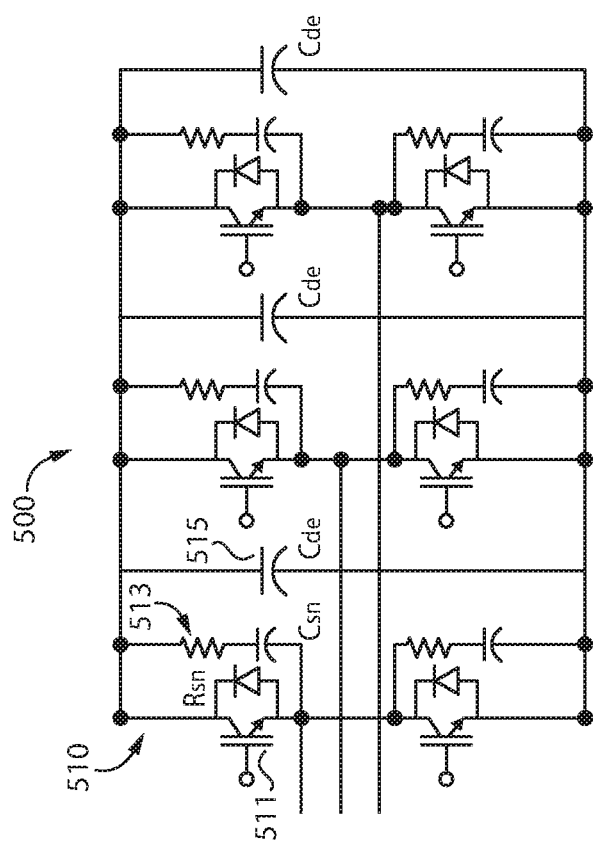
Fig. 5B
Fig. 5A

US 11,101,640 B1

SOLID-STATE PROTECTION FOR DIRECT CURRENT NETWORKS

BACKGROUND

The present disclosure relates generally to fault protection. Direct current (DC) distribution systems that include power converters interconnected by DC distribution lines also include protection systems to detect and isolate faults, such as short circuit faults. These protection systems may be placed near each power converter and on the DC distribution lines throughout the DC distribution system. In response to a detected fault on a DC distribution line, a protection system located next to a power converter will isolate the power converter from the DC distribution lines until the fault is isolated. Existing protection systems for DC distribution systems suffer from a number of shortcomings and disadvantages. There remain unmet needs including reducing protection system hardware requirements, reducing fault current interruption stress, and increasing fault location accuracy. For instance, conventional protection systems must interrupt the high magnitude fault current in order to isolate the detected fault. Furthermore, conventional protection systems only use a small set of measurements taken between the beginning of the fault and the fault isolation to determine a fault location. In view of these and other shortcomings in the art, there is a significant need for the apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include systems, methods, techniques and apparatuses for fault protection systems. Further embodiments, forms, objects, features, advantages, aspects and benefits of the disclosure shall become apparent from the following description and drawings.

BRIEF DESCRIPTION OF THE DRAWINGS

FIGS. 5A-5B illustrate exemplary power converters.

DETAILED DESCRIPTION OF ILLUSTRATIVE EMBODIMENTS

Figure 1:
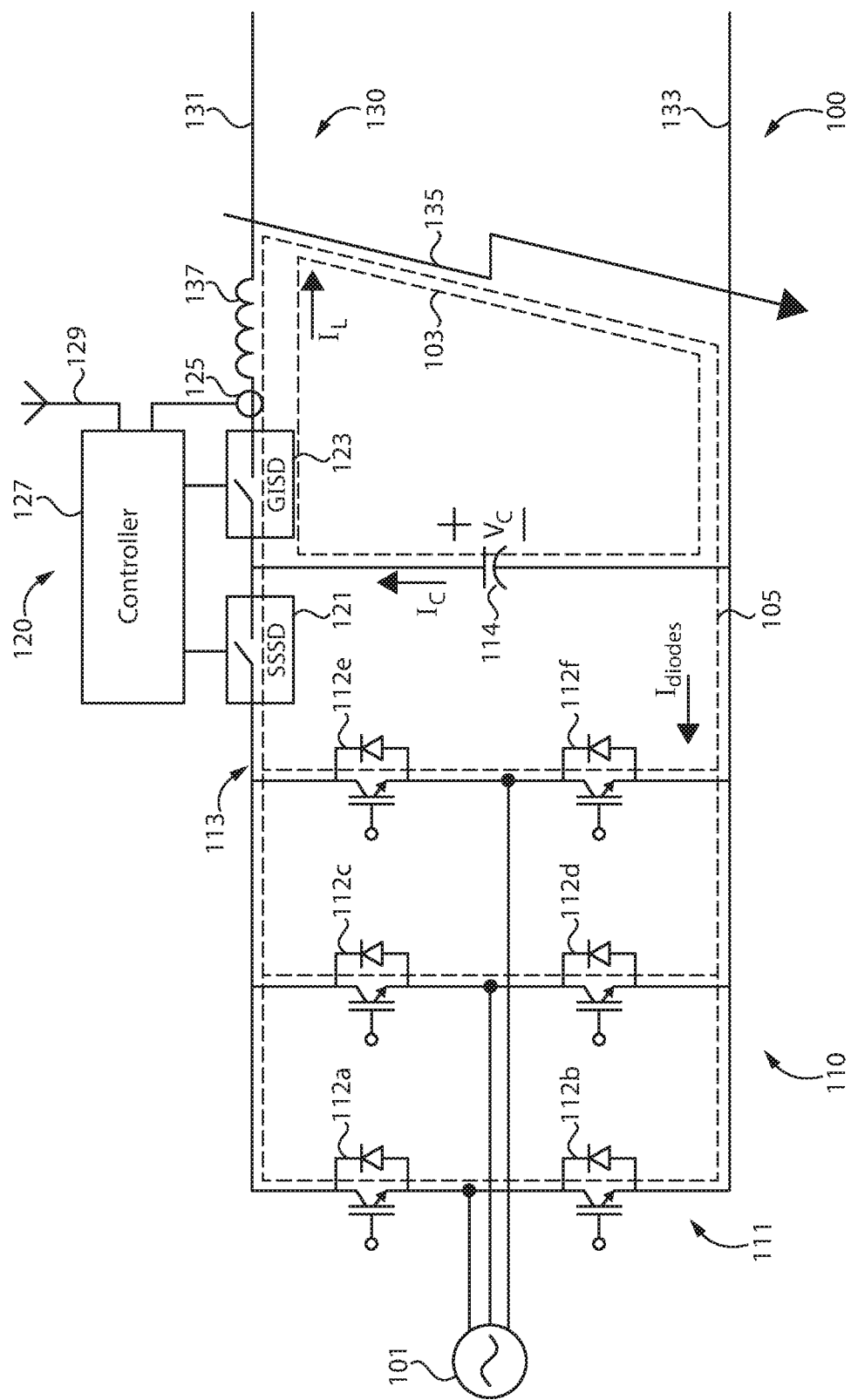
FIG. 1 illustrates an exemplary DC distribution system.

With reference to FIG. 1, there is illustrated an exemplary direct current (DC) distribution system 100. It shall be appreciated that system 100 may be implemented in a variety of applications, including utility grids, vehicular power systems, marine power systems, multi-drive power systems, DC charging systems, high voltage power systems, medium voltage power systems, and low voltage power systems, to name but a few examples.

DC distribution system 100 includes a bidirectional power converter 110 structured to convert power transferred between an alternating current (AC) network 101 and a DC network 130. Power converter 110 includes a switch arrangement 111 and DC link capacitor 114.

Switch arrangement 111 includes a plurality of semiconductor devices 112a-f arranged on three legs coupled across a DC bus 113. A first leg includes semiconductor devices 112a and 112b coupled in series at a midpoint connection. A second leg includes semiconductor devices 112c and 112d coupled in series at a midpoint connection. A third leg includes semiconductor devices 112e and 112f coupled in series at a midpoint connection. In the illustrated embodiment, semiconductor devices 112a-f are insulated gate bipolar transistors (IGBTs) coupled in an anti-parallel formation with a freewheeling diode. In other embodiments, switch arrangement 111 includes bipolar junction transistors (BJTs), metal-oxide-semiconductor field-effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of switching device structured to selectively control the flow of electric current.

In the illustrated embodiment, AC network 101 includes three phases, each phase being coupled to one midpoint connection of the three legs of switch arrangement 111. In other embodiments, switch arrangement 111 may be adapted to be coupled to an AC network having a different number of phases, or may be adapted to be coupled to a second DC network. In certain embodiments, AC network 101 is a power generation device, such as a wind turbine or a natural gas generator, to name but a few examples.

Switch arrangement 111 may be controlled by controller 127 or by a separate controller. Switch arrangement 111 may be structured to transmit power unidirectionally or bidirectionally. For example, switch arrangement 111 may be structured to receive AC power from AC network 101, convert the received power to DC power, and output the DC power to DC network 130. Switch arrangement 111 may also be structured to receive DC power from DC network 130, convert the received power to AC power, and output the AC power to AC network 101. In other embodiments, switch arrangement 111 may be organized into another topology such as a multi-level converter, a DC/DC buck converter, a DC/DC boost converter, or a topology having more or fewer phase legs, to name but a few examples. It shall be appreciated that switch arrangement 111 may be of any topology and have components structured to receive DC power from or provide DC power to DC network 130.

DC link capacitor 114 is structured to reduce transients, or smooth, DC power transmitted between switch arrangement 111 and DC network 130. DC link capacitor 114 is also structured to store energy during the operation of DC distribution system 100. During operation of system 100, there is a capacitor voltage $V_C$ across DC link capacitor 114 and a current $I_C$ flowing through DC link capacitor 114. In certain embodiments, DC link capacitor 114 is structured to be an aluminum electrolytic capacitor, a film capacitor, or a combination thereof, to name but a few examples. In certain embodiments, DC link capacitor 114 is a plurality of capacitors.

DC network 130 includes DC distribution lines 131 and 133. In the illustrated embodiment, a short circuit fault 135 is occurring on DC network 130 across DC distribution lines 131 and 133. The portion of DC distribution lines 131 and 133 between fault 135 and protection system 120 has a line inductance 137.

It is important to note that during a DC fault, fault current flows through a current path 103 including capacitor 114, galvanic isolation switching device 123, and portions of lines 131 and 133 having a line inductance 137, such that line current $I_L$ may be equal to capacitor current $I_C$. With solid-state switching device 121 being opened to isolate power converter 110 from fault 135, fault current 135 does not commutate from current path 103 to a second current path 105 including the diodes of switch arrangement 111 after capacitor 114 is fully discharged.

Protection system 120 is structured to isolate converter 110 from a fault 135 on DC network 130. In certain embodiments, protection system 120 or a portion thereof is incorporated into a housing of converter 110. In certain embodiments, protection system 120 or a portion thereof may be a retrofit kit structured to be coupled to converter 110.

Protection system 120 includes a solid-state switching device 121, a galvanic isolation switching device 123, a measuring device 125, and a controller 127 including a communication port 129. Solid-state switching device 121 is coupled to DC bus 113 between switch arrangement 111 and DC link capacitor 114. Solid-state switching device 121 is structured to selectively block the flow of current between switch arrangement 111 and DC link capacitor 114. Solid-state switching device 121 may include any type of semiconductor switch. It shall be appreciated that the illustrated solid-state switching device is not coupled in parallel with an energy dispersion device such as a metal-oxide varistor (MOV). Since protection system 120 is arranged such that solid-state switching device 121 only opens while not conducting the fault current and only opens while conducting low current, such as a current having a magnitude less than the fault current, a current having a magnitude less than two times the nominal current magnitude, or no current at all, solid-state switching device 121 does not require an MOV to be coupled in parallel.

Galvanic isolation switching device 123 is coupled between DC link capacitor 114 and DC network 130. Galvanic isolation switching device 123 is structured to selectively block the flow of current between power converter 110 and DC network 130. Galvanic isolation switching device 123 may be a mechanical switching device, or any other type of switching device structured to galvanically isolate power converter 110 from DC network 130. For example, galvanic isolation switching device 123 may include a mechanical disconnector switching device structured to open while not conducting current or not conducting a load current. During operation of system 100, a line current $I_L$ flows through galvanic isolation switching device 123 to DC network 130.

In certain embodiments, protection system 120 is structured to isolate power converter 110 from ground faults as well as short-circuit faults. For ground fault protection, protection system 120 additionally includes another solid-state switching device coupled between DC capacitor 114 and switch arrangement 111 on the negative pole of DC bus 113, and another galvanic isolation switching device coupled between DC link capacitor 114 and DC distribution line 133.

Measuring device 125 is structured to measure electrical characteristics of the DC power flowing through galvanic isolation switching device 123 and transmit the measurements to controller 127. For example, measuring device 125 may measure a magnitude of current $I_L$, to give but one example. In certain embodiments, measuring device 125 includes more than one measuring device. In certain embodiments, measuring device 125 is structured to measure capacitor voltage $V_C$. In certain embodiments, measuring device 125 may include a current sensor, a current transformer, a voltage sensor, or a voltage transformer, to name but a few examples.

Controller 127 is structured to operate solid-state switching device 121, operate galvanic isolation switching device 123, and receive measurements from measuring device 125. In the illustrated embodiment, controller 127 includes a communication port 129 structured to allow controller 127 to communicate with a controller of another protection system, a central control system, or another device structured to monitor or control DC distribution system 100. In certain embodiments, controller 127 includes multiple communication ports or no communication ports.

During operation of DC distribution system 100, controller 127 is structured to receive measurements from measuring device 125 and determine whether a fault condition has begun to occur. In response to determining a fault is occurring, controller 127 is structured to open solid-state switching device 121, receive measurements from measuring device 125, determine a fault location using measurements corresponding to a discharging capacitor current $I_C$, open galvanic isolation switching device 123 based on received measurements, close solid-state switching device 121 in response to determining fault 135 has been removed, and close galvanic isolation switching device 123 in response to determining DC link capacitor 114 has been charged.

In certain embodiments, controller 127 uses measurements or determined fault directions received from other protection systems or a central control system to determine a fault location. In certain embodiments, controller 127 transmits information such as measurements or a determined fault direction based on measurements received from measuring device 125 to a central control system so that the central control system can aggregate information from other protection systems and determine a fault location using the aggregated information. In certain embodiments, the central control system then transmits open commands to the protective devices closest to the fault in order to remove the fault from a DC distribution system.

In certain embodiments, controller 127 is structured to determine a fault is occurring within power converter 110 or within AC network 101 and open solid-state switching device 121 in response to determining the fault is occurring. Since solid-state switching device 121 blocks the flow of current from capacitor 114 to switch arrangement 111, switch arrangement 111 does not need to include desaturation protection to protect switch arrangement 111 from discharging capacitor current. It shall be appreciated that any or all of the foregoing features of the components of system 100 may also be present in the other components disclosed herein.

Figure 2:
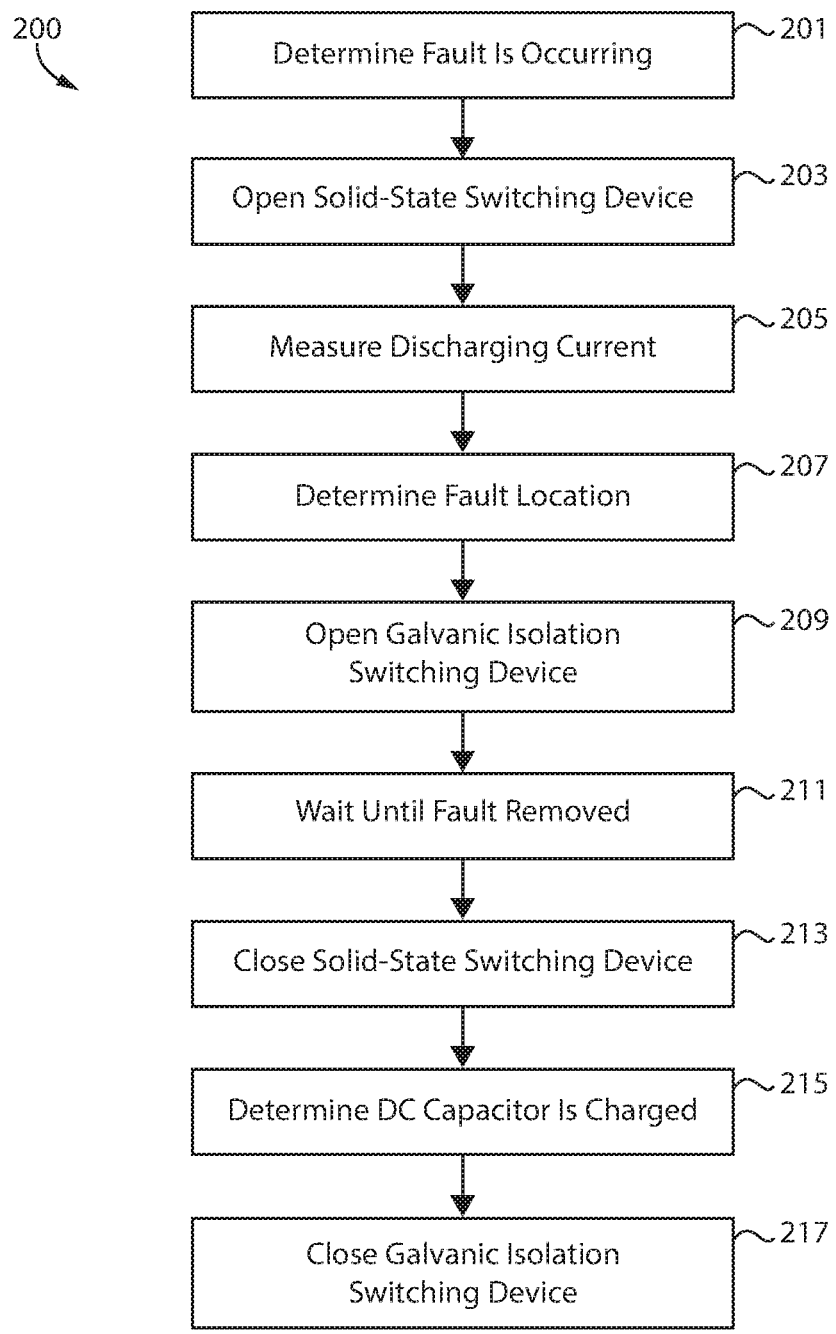
FIG. 2 is a flowchart illustrating an exemplary process for responding to a DC fault.

With reference to FIG. 2, there is a flowchart illustrating an exemplary protection system process 200 for responding to a DC fault in a DC distribution system using an exemplary protection system, such as protection system 120 in FIG. 1. Process 200 may be implemented in whole or in part in one or more of the protection system controllers disclosed herein. It shall be further appreciated that a number of variations and modifications to process 200 are contemplated including, for example, the omission of one or more aspects of process 200, the addition of further conditionals and operations, and/or the reorganization or separation of operations and conditionals into separate processes.

Process 200 begins at operation 201 where a controller of the protection system determines a fault is occurring within a DC network. In certain embodiments, the controller determines the fault is occurring based on measurements received from the measuring device of the protection system. In other embodiments, the controller determines the fault is occurring based on information received from another device by way of a controller communication port.

Process 200 proceeds to operation 203 where the controller opens a solid-state switching device coupled between a switch arrangement of the power converter and a DC link capacitor of the power converter. Since the fault current is flowing in a current path formed by the DC link capacitor, a galvanic isolation switching device, and the DC network, the solid-state switching device opens while conducting a low current having a magnitude less than the magnitude of the current received by the fault, also known as the fault current. The low current may include a current magnitude less than two times the nominal current magnitude. In other embodiments, the solid-state switching device opens while conducting no current.

Process 200 proceeds to operation 205 where the measuring device measures current flowing through the galvanic isolation switching device that is being discharged by the DC link capacitor to the fault. In conventional fault location, voltages and/or currents are collected to calculate the fault location before the protection device is opened. Normally, in DC systems, DC circuit breakers are opened fast, such as within 2 ms to avoid high current damages to power electronics devices. The measurements available for fault location are therefore collected in a short period of time. By contrast, when solid-state switching device 121 is opened, the discharging currents and induced voltages continue and may be measured to determine the fault location. In this way, more measurements can be collected in order to increase the determined fault location accuracy.

Process 200 proceeds to operation 207 where the controller determines a location of the fault based on measurements collected during operation 205. The controller may determine the location of the fault based solely on measurements from the measuring device taken while the DC link capacitor is being discharged. The controller may also determine the location of the fault based on measurements received from other protection systems of the DC distribution system. In certain embodiments, the controller determines a location of the fault by transmitting the measurements or fault directions based on the measurements to a central control system. The central control system may then transmit a fault location based on a plurality of measurements received from other measuring devices of the DC distribution system.

In certain embodiments, the controller determines the location of the fault by using the measurements to calculate the inductance of the distribution line between the fault and the measuring device. Using known line inductance characteristics and the calculated inductance, the controller can determine the distance of the fault from the measuring device. In certain embodiments, the controller determines the location of the fault using a fault direction determined using the measurements, as well as other determined fault directions received from other devices of DC distribution system 100.

Process 200 proceeds to operation 209 where the controller opens the galvanic isolation switching device. The controller may open the galvanic isolation switching device in response to determining the fault current magnitude has decreased to zero. It shall be appreciated that the galvanic isolation device does not need to interrupt the discharging current as discharging current will dissipate without harming the distribution lines, as the lines have higher fault current tolerances than power converter 110.

Process 200 proceeds to operation 211 where the controller waits until the located fault has ended or been isolated from the healthy portion of the DC distribution system and therefore removed from the DC distribution system. In certain embodiments, the controller waits on an instruction from a central control system indicating the fault is removed, or the controller waits until the controller determines the fault has been removed based on measurements from the measuring device of the protection system.

Process 200 proceeds to operation 213 where the controller closes the solid-state switching device in response to determining the fault has been removed. The controller closes the solid-state switching device in order to charge the DC link capacitor with the switching arrangement of the power converter.

Process 200 proceeds to operation 215 where the controller determines the DC link capacitor has been charged. For example, the controller may determine the DC link capacitor has been charged by determining a voltage across the DC link capacitor has exceeded a charging threshold value.

Process 200 proceeds to operation 217 where the controller closes the galvanic isolation switching device in response to determining the DC link capacitor has been charged, allowing the DC distribution system to return to normal operation.

Figure 3:
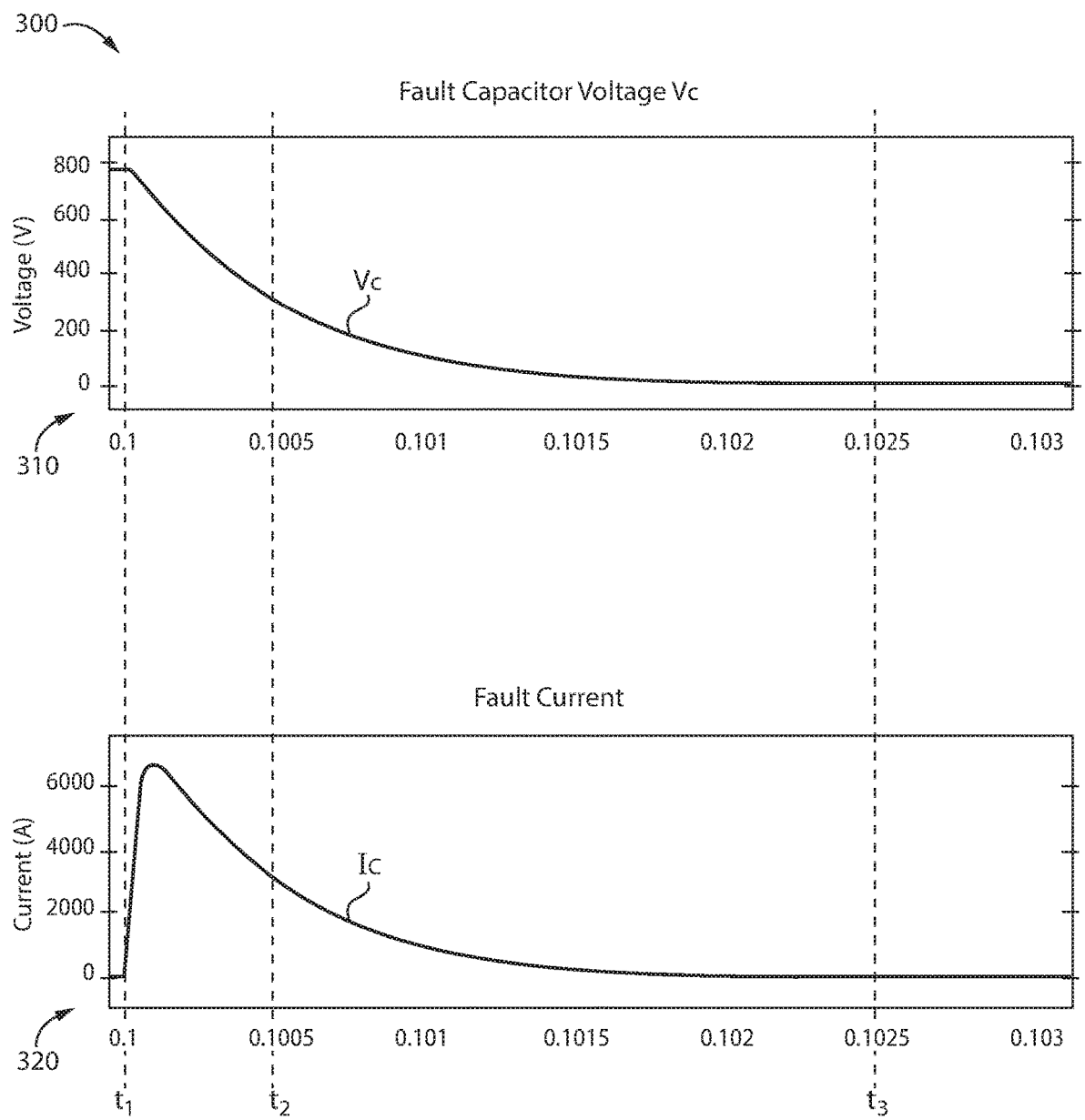
FIG. 3 is a set of graphs illustrating electrical characteristics of the DC distribution system in FIG. 1 while the exemplary protection system responds to a DC fault.

With reference to FIG. 3, there is a plurality of graphs 300 illustrating electrical characteristics of DC distribution system 100 during a fault. It shall be appreciated that the voltages and currents illustrated in the plurality of graphs 300 are but one example of the values voltages and currents of an exemplary system. Graph 310 illustrates capacitor voltage $V_C$. Graph 320 illustrates current $I_C$. The plurality of graphs 300 include time instants $t_1$-$t_3$.

Before time instant $t_1$, the diodes of power converter 110 conduct current $I_{diodes}$ at a nominal current magnitude and capacitor 114 is fully charged. At time instant $t_1$, fault 135 begins to occur across distribution lines 131 and 133. Between time instant $t_1$ and time instant $t_3$, Current $I_L$ composed of current $I_C$, or mainly current $I_C$, increases to a peak before decreasing to zero and capacitor voltage $V_C$ decreases to zero as capacitor 114 is discharged. Current $I_{diodes}$ is zero when solid-state switching device 121 is opened at time instant $t_2$ between time instants $t_1$ and $t_3$. Solid-state switching device 121 may conduct low current between time instants $t_1$ and $t_2$ and is not conducting current between time instants $t_1$ and $t_3$. Solid-state switching device 121 is opened between time instants $t_1$ and $t_3$, at time instant $t_2$, allowing switch arrangement 111 to be isolated from fault 135 without solid-state switching device 121 having to interrupt the fault current flowing through current path 103. After solid-state switching device 121 opens but before time instant $t_3$, measuring device 125 measures current being discharged from capacitor 114, and may also measure a voltage of the discharging current, such as capacitor voltage $V_C$.

At time instant $t_3$, current $I_C$ has decreased to zero and galvanic isolation switching device 123 is opened while not conducting current. It shall be appreciated that protection system 120 is structured to isolate fault 135 without opening either switching device 121 or 123 while conducting a fault current. In certain embodiments, protection system 120 is structured to isolate fault 135 by opening both switching devices 121 and 123 while not conducting the fault current.

Figure 4:
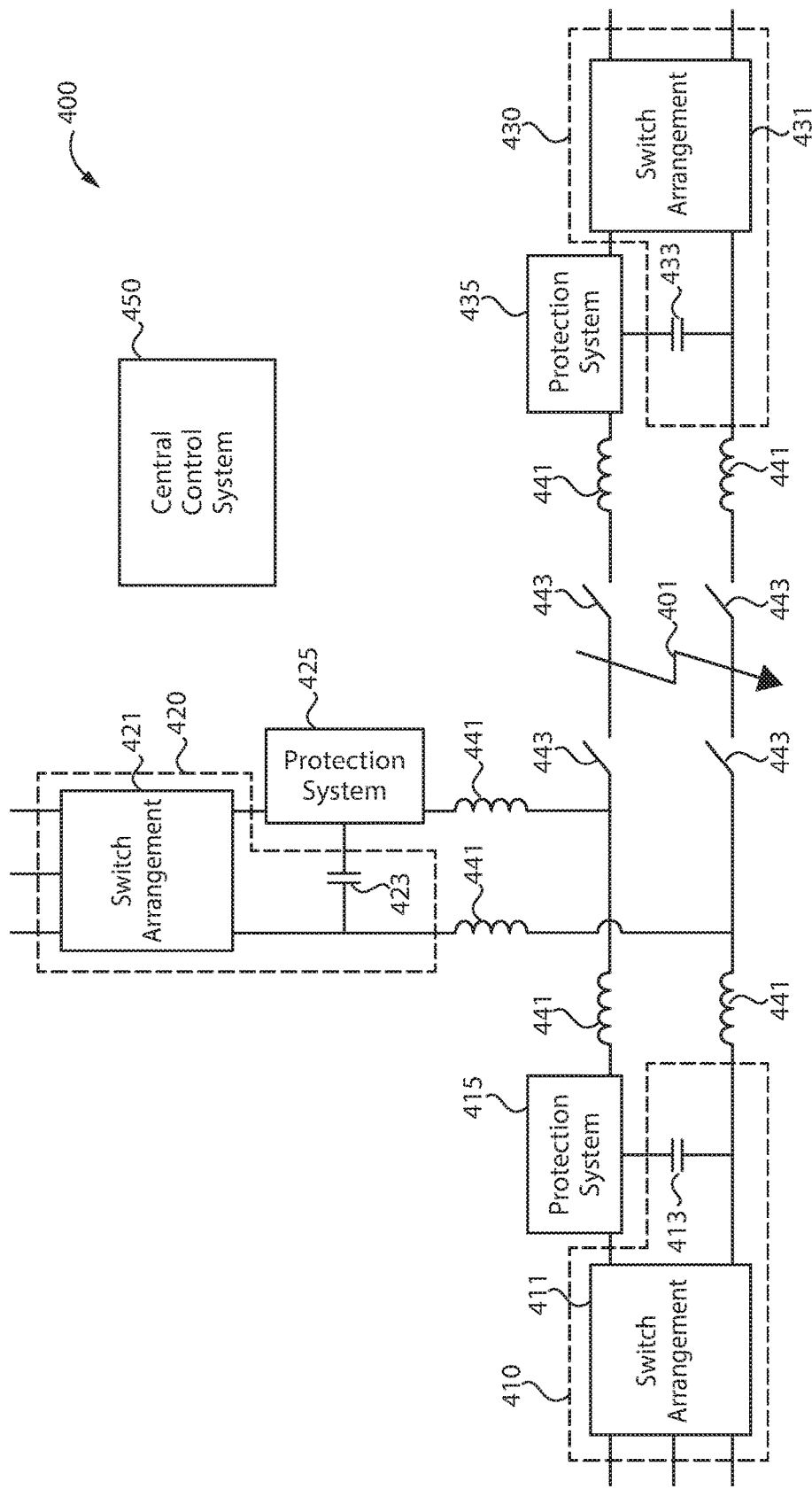
FIG. 4 illustrates another exemplary DC distribution system.

With reference to FIG. 4, there is illustrated an exemplary DC distribution system 400 including a DC network 440 interconnecting power converters 410, 420, and 430. Power converter 410 includes switch arrangement 411 and DC link capacitor 413. Power converter 420 includes switch arrangement 421 and DC link capacitor 423. Power converter 430 includes switch arrangement 431 and DC link capacitor 433. System 400 also includes protection systems 415, 425, and 435 coupled to power converters 410, 420, and 430, respectively. DC network 440 includes line inductances 441 for each of the distribution lines of DC network 440. DC network 440 also includes a plurality of protective switches 443.

System 400 also includes a central control system 450 structured to communicate with protection systems 415, 425, and 435, as well a plurality of protective switches 443. In response to determining fault 401 is occurring in DC network 440, each of the protection systems 415, 425, and 435 execute an exemplary protection process, such as process 200 in FIG. 2.

As part of the operation for determining fault location, protection systems 415, 425, and 435 may transmit information based on measurements including the measurements themselves or fault directions determined using the measurements to central control system 450. Central control system 450 may determine the location of fault 401 using the received information. For example, central control system 450 may determine the location of the fault using the fault directions determined by the protection systems.

In response to determining the location of fault 401, central control system 450 transmits open commands to the switching devices closest to fault 401, in this case the plurality of protective switches 443. The protection devices 443 closest to the location of fault 401 execute an exemplary protection operation, such as operation 209 in process 200 in FIG. 2. In certain embodiments, the plurality of protective switches 443 open once the fault current magnitude decreases to nominal current levels. Once the plurality of protective switches 443 are opened, fault 401 is removed and the remaining healthy portion of system 400 including power converters 410, 420, and 430 may resume normal operation by recharging DC link capacitors 413, 423, and 433 and reconnecting to DC network 440.

With reference to FIG. 5A, there is a circuit diagram illustrating an exemplary switch arrangement 500 structured to convert power transmitted between a three phase network and a DC network. Switch arrangement 500 includes three legs including leg 510. Each leg includes semiconductor devices such as semiconductor device 511 of leg 510. Each semiconductor device is coupled in parallel with an RC snubber circuit such as RC snubber circuit 513 coupled in parallel with semiconductor device 511. A decoupling capacitor is coupled in parallel with each leg, such as decoupling capacitor 515 coupled in parallel with leg 510. The plurality of RC snubber circuits and decoupling capacitors are structured to protect switch arrangement 500 from overvoltage conditions caused by opening a solid-state switching device of an exemplary protection system coupled to switch arrangement 500.

With reference to FIG. 5B, there is a circuit diagram illustrating an exemplary switch arrangement 520 structured to convert power transmitted between a three phase network and a DC network. Switch arrangement 520 includes three legs including leg 530. Each leg includes semiconductor devices such as semiconductor device 531 of leg 530. Each semiconductor device is coupled in parallel with an RC snubber circuit such as RC snubber circuit 533 coupled in parallel with semiconductor device 531. Another RC snubber circuit including a series coupled capacitor 525 and resistor 523 coupled across DC bus 521 and a diode 527 coupled in parallel with resistor 523. The RC snubber circuits are structured to protect switch arrangement 500 from overvoltage conditions caused by opening a solid-state switching device of an exemplary protection system coupled to switch arrangement 500.

Further written description of a number of exemplary embodiments shall now be provided. One embodiment is a protection system comprising a solid-state switching device coupled between a switch arrangement of a power converter and a direct current (DC) link capacitor of the power converter, the switch arrangement being structured to convert power transmitted between a DC network and a second network; a galvanic isolation switching device coupled between the DC link capacitor and the DC network; and a controller structured to determine a fault is occurring within the DC network, open the solid-state switching device in response to determining the fault is occurring, receive a measurement corresponding to an electrical characteristic of a fault current flowing through the galvanic isolation switching device while the solid-state switching device is open, and determine a location of the fault based on the received measurement.

In certain forms of the foregoing protection system, the controller is structured to open the solid-state switching device while the fault current is conducted in a current path including the DC link capacitor and not including the solid state switching device. In certain forms, the controller is structured to open the galvanic isolation switching device in response to a magnitude of the fault current decreasing to zero. In certain forms, the controller is structured to close the solid-state switching device in response to determining the fault has been removed from the DC network, and close the galvanic isolation switching device in response to determining the switch arrangement has charged the DC link capacitor. In certain forms, the controller is structured to open the solid-state switching device in response to determining the fault is occurring while the solid-state switching device is not conducting the fault current. In certain forms, the fault current is a discharging current flowing from the DC link capacitor to the fault. In certain forms, the controller is structured to open the solid-state switching device in response to determining a second fault is occurring within the switch arrangement. In certain forms, determining the fault location includes transmitting information based on the received measurement to a central control system, and wherein the central control system determines the fault location based on an aggregation of information received from a plurality of protection systems including the protection system.

Another exemplary embodiment is a method for protecting a direct current (DC) distribution system comprising: operating a power converter including a switch arrangement and a DC link capacitor; operating a protection system including a solid-state switching device coupled between the switch arrangement and the DC link capacitor of the power converter, and a galvanic isolation switching device coupled between the DC link capacitor and a DC network, the switch arrangement being structured to convert power transmitted between the DC network and a second network; determining a fault is occurring; opening the solid-state switching device in response to determining the fault is occurring; receiving a measurement corresponding to an electrical characteristic of a fault current flowing through the galvanic isolation switching device while the solid-state switching device is open; and determining a location of the fault based on the received measurement.

In certain forms of the foregoing method, the method comprises opening the galvanic isolation switching device in response to a magnitude of the fault current decreasing to zero. In certain forms, the method comprises closing the solid-state switching device in response to determining the fault has been removed from the DC network; charging the DC link capacitor using the switch arrangement; and closing the galvanic isolation switching device in response to determining the DC link capacitor is charged. In certain forms, opening the solid-state switching device occurs while the solid-state switching device is not conducting the fault current. In certain forms, the fault current is a discharging current flowing from the DC link capacitor to the fault. In certain forms, the method comprises opening the solid-state switching device in response to determining a second fault is occurring within the switch arrangement. In certain forms, determining the fault location includes transmitting information based on the received measurement to a central control system and determining the fault location based on an aggregation of information received from a plurality of protection systems including the protection system. In certain forms, opening the solid-state switching device occurs while the fault current is conducted in a current path including the DC link capacitor and not including the solid-state switching device.

A further exemplary embodiment is a direct current (DC) distribution system comprising: a power converter including a switch arrangement and a DC link capacitor the switch arrangement being structured to convert power transmitted between a DC network and a second network; and a protection system including: a solid-state switching device coupled between the switch arrangement and the DC link capacitor, a galvanic isolation switching device coupled between the DC link capacitor and the DC network, and a controller structured to determine a fault is occurring within the DC network, open the solid-state switching device in response to determining the fault is occurring, receive a measurement corresponding to an electrical characteristic of a fault current flowing through the galvanic isolation switching device while the solid-state switching device is open, and determine a location of the fault based on the received measurement.

In certain forms of the foregoing DC distribution system, the system comprises a central control system structured to receive information based on the received measurement from the protection system, determine the fault location based on an aggregation of information received from a plurality of protection systems including the protection system, and transmit open commands to a plurality of switching device of the DC distribution system closest to the fault location. In certain forms, the controller is structured to open the solid-state switching device while the fault current includes a current path including the DC link capacitor and not including the solid-state switching device, and wherein the controller is structured to open the galvanic isolation switching device in response to a magnitude of the fault current decreasing to zero. In certain forms, the controller is structured to open the solid-state switching device in response to determining the fault is occurring while the solid-state switching device is not conducting the fault current, and wherein the fault current is a discharging current flowing from the DC link capacitor to the fault.

It is contemplated that the various aspects, features, processes, and operations from the various embodiments may be used in any of the other embodiments unless expressly stated to the contrary. Certain operations illustrated may be implemented by a computer including a processing device executing a computer program product on a non-transient, computer-readable storage medium, where the computer program product includes instructions causing the processing device to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A protection system comprising:
   a solid-state switching device coupled between a switch arrangement of a power converter and a direct current (DC) link capacitor of the power converter, the switch arrangement being structured to convert power transmitted between a DC network and a second network;
   a galvanic isolation switching device coupled between the DC link capacitor and the DC network; and
   a controller structured to determine a fault is occurring within the DC network, open the solid-state switching device in response to determining the fault is occurring, receive a measurement corresponding to an electrical characteristic of a fault current flowing through the galvanic isolation switching device while the solid-state switching device is open, and determine a location of the fault based on the received measurement.

2. The protection system of claim 1, wherein the controller is structured to open the solid-state switching device while the fault current is conducted in a current path including the DC link capacitor and not including the solid state switching device.

3. The protection system of claim 2, wherein the controller is structured to open the galvanic isolation switching device in response to a magnitude of the fault current decreasing to zero.

4. The protection system of claim 3, wherein the controller is structured to close the solid-state switching device in response to determining the fault has been removed from the DC network, and close the galvanic isolation switching device in response to determining the switch arrangement has charged the DC link capacitor.

5. The protection system of claim 1, wherein the controller is structured to open the solid-state switching device in response to determining the fault is occurring while the solid-state switching device is not conducting the fault current.

6. The protection system of claim 1, wherein the fault current is a discharging current flowing from the DC link capacitor to the fault.

7. The protection system of claim 1, wherein the controller is structured to open the solid-state switching device in response to determining a second fault is occurring within the switch arrangement.

8. The protection system of claim 1, wherein determining the fault location includes transmitting information based on the received measurement to a central control system, and wherein the central control system determines the fault location based on an aggregation of information received from a plurality of protection systems including the protection system.

9. A method for protecting a direct current (DC) distribution system comprising:
   operating a power converter including a switch arrangement and a DC link capacitor;
   operating a protection system including a solid-state switching device coupled between the switch arrangement and the DC link capacitor of the power converter, and a galvanic isolation switching device coupled between the DC link capacitor and a DC network, the switch arrangement being structured to convert power transmitted between the DC network and a second network;
   determining a fault is occurring;
   opening the solid-state switching device in response to determining the fault is occurring;
   receiving a measurement corresponding to an electrical characteristic of a fault current flowing through the galvanic isolation switching device while the solid-state switching device is open; and
   determining a location of the fault based on the received measurement.

10. The method of claim 9, comprising opening the galvanic isolation switching device in response to a magnitude of the fault current decreasing to zero.

11. The method of claim 10, comprising:
   closing the solid-state switching device in response to determining the fault has been removed from the DC network;
   charging the DC link capacitor using the switch arrangement; and
   closing the galvanic isolation switching device in response to determining the DC link capacitor is charged.

12. The method of claim 9, wherein opening the solid-state switching device occurs while the solid-state switching device is not conducting the fault current.

13. The method of claim 9, wherein the fault current is a discharging current flowing from the DC link capacitor to the fault.

14. The method of claim 9, comprising opening the solid-state switching device in response to determining a second fault is occurring within the switch arrangement.

15. The method of claim 9, wherein determining the fault location includes transmitting information based on the received measurement to a central control system and determining the fault location based on an aggregation of information received from a plurality of protection systems including the protection system.

16. The method of claim 9, wherein opening the solid-state switching device occurs while the fault current is conducted in a current path including the DC link capacitor and not including the solid-state switching device.

17. A direct current (DC) distribution system comprising:
   a power converter including a switch arrangement and a DC link capacitor the switch arrangement being structured to convert power transmitted between a DC network and a second network; and
   a protection system including:
      a solid-state switching device coupled between the switch arrangement and the DC link capacitor,
      a galvanic isolation switching device coupled between the DC link capacitor and the DC network, and
      a controller structured to determine a fault is occurring within the DC network, open the solid-state switching device in response to determining the fault is occurring, receive a measurement corresponding to an electrical characteristic of a fault current flowing through the galvanic isolation switching device while the solid-state switching device is open, and determine a location of the fault based on the received measurement.

18. The DC distribution system of claim 17, comprising a central control system structured to receive information based on the received measurement from the protection system, determine the fault location based on an aggregation of information received from a plurality of protection systems including the protection system, and transmit open commands to a plurality of switching device of the DC distribution system closest to the fault location.

19. The DC distribution system of claim 17, wherein the controller is structured to open the solid-state switching device while the fault current includes a current path including the DC link capacitor and not including the solid-state switching device, and wherein the controller is structured to open the galvanic isolation switching device in response to a magnitude of the fault current decreasing to zero.

20. The DC distribution system of claim 17, wherein the controller is structured to open the solid-state switching device in response to determining the fault is occurring while the solid-state switching device is not conducting the fault current, and wherein the fault current is a discharging current flowing from the DC link capacitor to the fault.

* * * * *